April 14, 1970     R. WANNER ET AL     3,506,921

CO-ORDINATION SYSTEM FOR TWO COACTING UNITS

Filed June 6, 1967     3 Sheets-Sheet 1

Rudolf Wanner
Berthold Mader
INVENTORS.

BY Karl G. Ross
Attorney

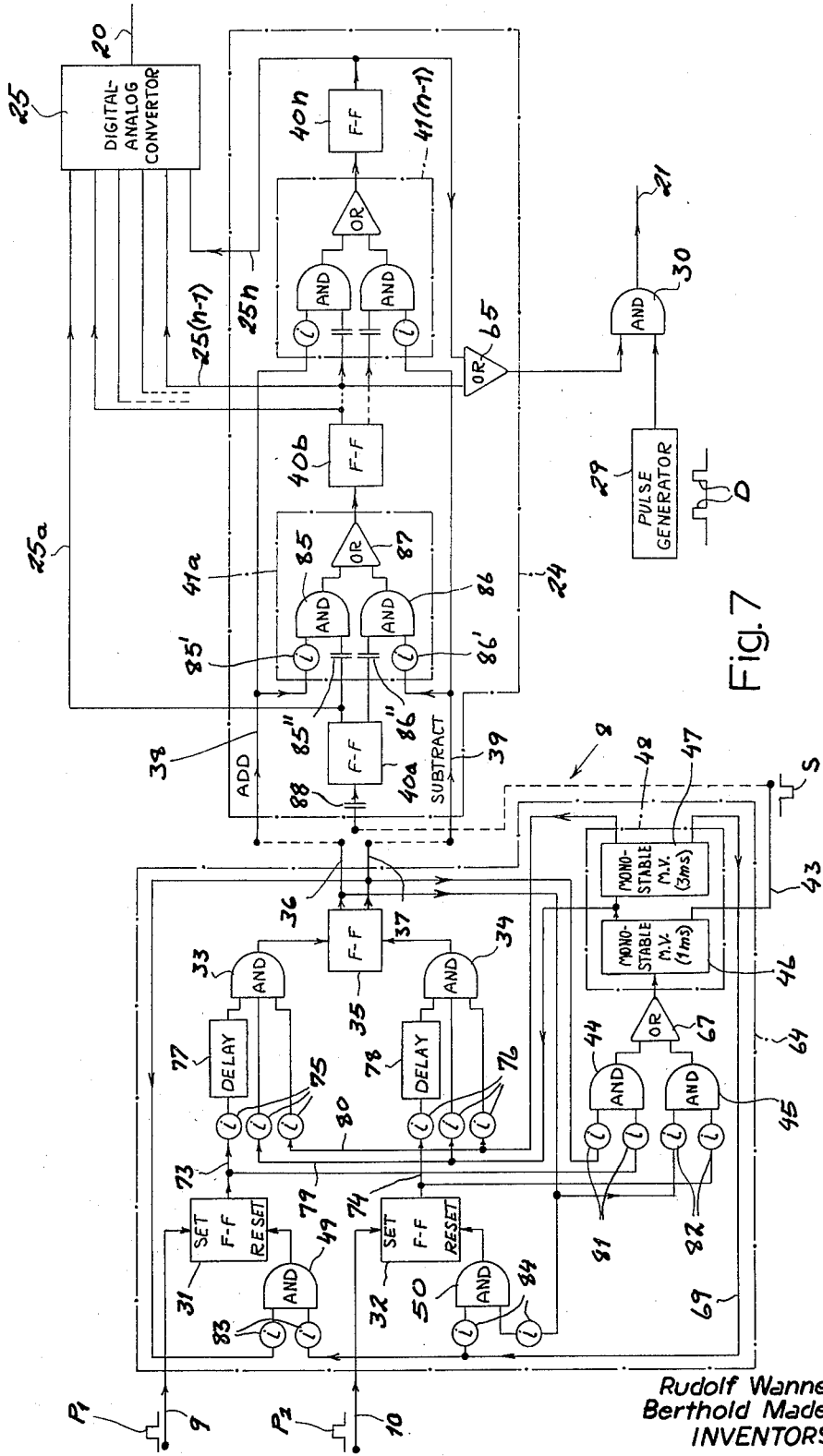

Rudolf Wanner
Berthold Mader
INVENTORS.

3,506,921
CO-ORDINATION SYSTEM FOR TWO
COACTING UNITS
Rudolf Wanner and Berthold Mader, Augsburg, Germany, assignors to Firma Bowe Bohler & Weber KG., Augsburg, Germany, a corporation of Germany
Filed June 6, 1967, Ser. No. 643,887
Claims priority, application Germany, June 7, 1966, B 87,453
Int. Cl. H03k 17/02
U.S. Cl. 328—70
15 Claims

ABSTRACT OF THE DISCLOSURE

System for co-ordinating, within predetermined tolerance limits, the operations of two coacting units, such as a paper-feeding and a paper-cutting machine, wherein each unit generates a train of metering pulses with a cadence proportional to its operating speed and these pulses are differentially fed to a digital counter whose output controls (e.g. arrests) one or both units to vary their relative speed upon the reading of the counter exceeding a predetermined value; before reaching the counter, the metering pulses are temporarily stored in repective input flip-flops individual to the two units and generate delayed stepping pulses for the counter which also receives from an output flip-flop, controlled by the corresponding input flip-flop, a sign-indicating signal determining whether the counter is to respond additively or subtractively to the stepping pulse. The transmission channels between the input flip-flops and the output flip-flop are blocked for a predetermined period, sufficient to enable stepping of the counter, whenever the output flip-flop is in a condition assigned to the input flip-flop tripped by an incoming metering pulse; when both input flip-flops are tripped by substantially simultaneous metering pulses from the two units, a first stepping pulse due to the set condition of one input flip-flop (i.e. the one corresponding to the existing condition of the output flip-flop) actuates the counter in one sense (e.g. additively) whereupon that input flip-flop is reset and the transmisison channel to the output flip-flop from the other input flip-flop is reopened so that the output flip-flop is reversed and a further stepping pulse actuates the counter in the opposite sense (e.g. subtractively) before the second input flip-flop is also reset.

Our present invention relates to a system for coordinating the operations of two coacting but not exactly synchronizable units such as, for example, a web-feeding machine and a web-cutting machine, with the first machine operating continuously to deliver a web of paper or the like to the second machine which operates intermittently to sever the web into sections of fixed or adjustable length.

The general object of our invention is to provide an efficient and reliable system for regulating the relative operating speed of two dissimilar but coacting units so as to make them keep pace with each other within predetermined tolerance limits.

A more particular object of our invention is to provide, in a plant comprising a web-feeding and a web-cutting machine operatively associated with each other, improved means for maintaining a certain slack in the web passing from the feeding to the cutting machine, this slack being always sufficient to prevent any overtensioning of the web without becoming so excessive that the web will drag on the floor or become entangled in the machinery.

These objects are realized, pursuant to our present invention, by the provision of a pair of pulse generators respectively coupled with the two units whose relative speed is to be regulated, these generators producing a pair of pulse trains of a cadence corresponding to the respective operating speeds of the two units. The two pulse trains are differentially fed to a digital counter whose reading thus corresponds at any time to the cumulative difference in operating speed as metered by these pulses, i.e. to the extent of the lead of the first unit over the second one (or, conversely, the lag of the second unit with reference to the first one) as expressed, for example, in the slack of a paper web fed continuously by the first unit to the second unit for cutting or other intermittent processing.

According to a more particular feature of our invention, the metering pulses delivered by the two independently driven generators are evacuated in a control circuit which temporarily stores these pulses with the aid of respective input flip-flops and, upon the setting of either flip-flop by a corresponding metering pulse, produces a stepping pulse for the associated counter; an output flip-flop, operating as a bistable element, has two operating conditions respectively assigned to the two input flip-flops; depending on which of these flip-flops has been set, the bistable element supplies one of two indicating signals to the counter whereby the latter registers the next stepping pulse either in an additive or in a subtractive sense.

Because the two pulse trains occur with random relative timing, metering pulses from both generators may reach the two input flip-flops substantially simultaneously or in such rapid succession that the counter could not properly respond to them if the aforedescribed storage facilities in the control circuit were not provided. Advantageously, in accordance with a further feature of our invention, this control circuit also includes a timer which blocks the transmission of a metering pulse from either input flip-flop to the output flip-flop during generation of a stepping pulse in response to an immediately preceding metering pulse; the timer, and with it the blocking means in the transmission channel between the input flip-flops and the output flip-flop, starts its operating cycle whenever the operating condition of the output flip-flop is the one assigned to the particular input flip-flop which has been set by an incoming metering pulse. A certain delay in the transmission of pulses from the input flip-flops to the output flip-flop prevents a reversal of the latter if both input flip-flops are set by concurrent metering pulses since under these conditions the timer, which also acts as the source of stepping pulses, will respond first to that input flip-flop to which the instantaneous postion of the output flip-flop is assigned; after the corresponding stepping pulses have been registered in the counter, the first input flip-flop is reset by a termination signal from the timer whereupon the second input flip-flop, through its now unblocked transmission channel, reverses the output flip-flop so that its own metering pulses can be registered in a new timing cycle. Since two concurrent metering pulses in the input of the control circuit always cancel each other insofar as the reading of the counter is concerned, it makes no difference whether in such case the counter is first stepped in an additive or a subtractive sense.

The termination signal, emitted by the timer during each operating cycle for the purposes of resetting the previously set input flip-flop, may be generated in various ways, e.g. by the return of a monostable multivibrator to its normal condition.

Conventional logic circuitry may be used for the resetting of the input flip-flops and for the blocking and unblocking of the transmission channels to the output flip-flop. Conjunctive gates, such as AND or NOR circuits with two or more inputs, can be employed for these purposes, as distinct from disjunctive gates (such as OR or NAND circuits) which may serve for initiating the operation of the timer and stepping-pulse source. Since a NOR circuit is the equivalent of an AND circuit with inverted inputs, this type of conjunctive gate will be represented in the following detailed description and the accompanying drawing by a combination of inverters and an AND circuit.

The utilization of the reading of the counter for the regulation of the operating speed of either or both associated units may be realized in various ways. Thus, we may use a digital-analog converter whose output accelerates or retards the first (e.g. paper-feeding) unit when the differential count drops below a predetermined lower limit or surpasss a predetermined upper limit, respectively. If the counter comprises a multistage binary register, the presence of a "1" in one or more of the highest-order stages of that register may serve as an indication that the differential count (and therefore the slack of the web in the aforedescribed paper-processing plant) has reached a maximum value, a signal from these register stages being usable to energize a driving circuit for the second machine which is thus set in motion to prevent further increases in the count.

The invention will be described in greater detail with reference to the accompanying drawing in which:

FIG. 7 is a still more detailed circuit diagram of the system of FIG 5; and

Figure 1:
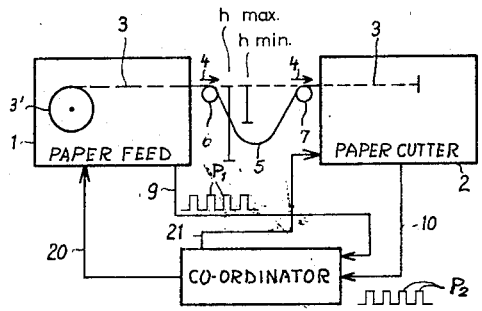
FIG. 1 is a diagrammatic view of a plant with two coacting units co-ordinated by a system according to the invention.

Reference will first be made to FIG. 1 for a description of a paper-processing plant comprising two coacting units, namely a paper-feeding machine 1 and a paper-cutting machine 2. A web of paper 3 is continuously delivered, from a supply reel 3', by the machine 1 which feeds it to the machine 2, as indicated by arrows 4; the web 3 may be advanced by a continuously driven roller 6, forming part of machine 1, and an intermittently driven roller 7, forming part of machine 2, between which the web hangs down with a variable degree of slack 5. Depending on the relative speed of the two machines 1 and 2, the bight of the slack web portion 5 may shift between an upper level $h_{min}$ (minimum slack) and a lower level $h_{max}$ (maximum slack). The regulation of the relative speed of machines 1 and 2, and therefore of the degree of slack, is accomplished by a co-ordinator diagrammatically indicated at 8; this co-ordinator has two input lines 9 and 10, respectively originating at machines 1 and 2, and two output lines 20 and 21, respectively terminating at these machines.

The slack 5 of the web 3 may be regarded as a buffer store in which a variable supply of working material is held in reserve.

Figure 2:
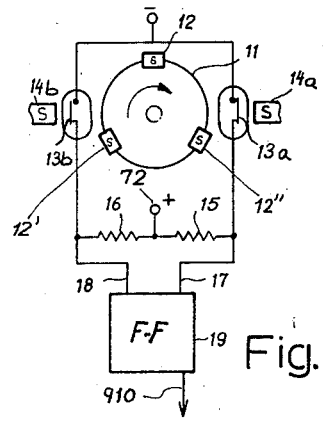
FIG. 2 is a detailed diagram of a pulse generator forming part of the system of FIG. 1.

In accordance with an important aspect of our invention, each of the machines 1 and 2 is equipped with a generator of metering pulses which is driven at the operating speed of the machine, or at some other speed proportional thereto. Thus, the generator of machine 1, producing a train of pulses $P_1$ delivered over line 9, may be positively coupled with the shaft of feed roller 6 whereas the generator of machine 2, delivering a train of pulse $P_2$ over line 10, may be similarly coupled with the shaft of feed roller 7; the latter roller may rotate in timed relationship with a knife, not shown, which cuts the oncoming paper web into sections. FIG. 2 illustrates a representative embodiment of such pulse generator comprising a disk 11 on a shaft 11' which could be one of the aforementioned roller shafts. A pair of normally closed switches 13a and 13b are connected in parallel between a negative and a positive terminal 71, 72, each of these switches lying in series with a respective resistor 15, 16. Each switch 13a, 13b may be in the form of a reed-type magnetic relay having its armature lying in the field of a respective permanent magnet 14a or 14b. Other permanent magnets 12, 12', 12" are so disposed along the periphery of disk 11 as to move at different times past the switches 13a, 13b, neutralizing upon each such passage the field of the corresponding fixed magnet 14a or 14b so that the switch opens momentarily. Such momentary opening places a positive potential on either of two input leads 17, 18 of a flip-flop 19 whose output lead 910 is representative of either of the lines 9, 10 in FIG. 1.

Figure 3:
FIG. 3 is a set of graphs illustrating the generation of metering pulses by the arrangement of FIG. 2.

The generator just described has the advantage of delivering clean rectangular pulses regardless of any possible chattering of the relay contacts. This has been illustrated in FIG. 3 which shows at 22a the positive voltage pulses appearing on line 17 whenever one of the magnets 12, 12', 12" moves past the relay 13a, the corresponding pulses on line 18 having been designated 22b. Whereas the leading and trailing edges of pulses 22a, 22b are fuzzy on account of repeated contact openings and closures by the vibrating reeds, the pulses P in the output 910 of flip-flop 19 are sharply defined since the flip-flop is reversed only once per pulse 22a or 22b. The width of metering pulses P is determined, of course, by the relative staggering of pulses 22a and 22b which in turn depends on the geometry of the assembly 13a, 13b and 11.

Figure 4:
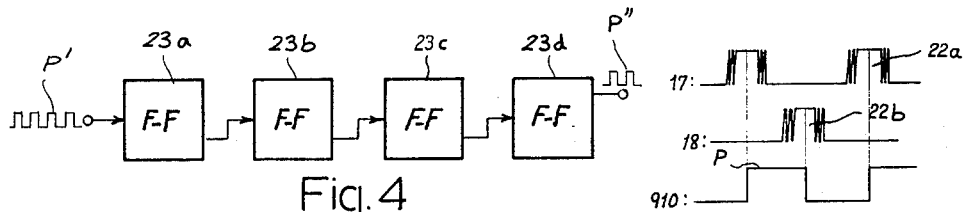
FIG. 4 is a diagrammatic representation of a frequency divider adapted to be used in the system of FIG 1.

It will be apparent that pulses P are representative of either pulse train $P_1$ or $P_2$ in FIG. 1. These latter pulse trains, however, could also have a cadence which is either a fraction or a multiple of the recurrence frequency of pulses P as produced by the generators respectively associated with machines 1 and 2. A frequency divider for stepping down the pulse cadence has been illustrated diagrammatically in FIG. 4. This circuit comprises a plurality of flip-flops 23a, 23b, 23c, 23d connected in cascade, the train of outgoing pulses P" having a recurrence frequency which is the $(2^p)$th part of the frequency of incoming pulses P' where $p$ is the number of flip-flops (here four).

Figure 5:
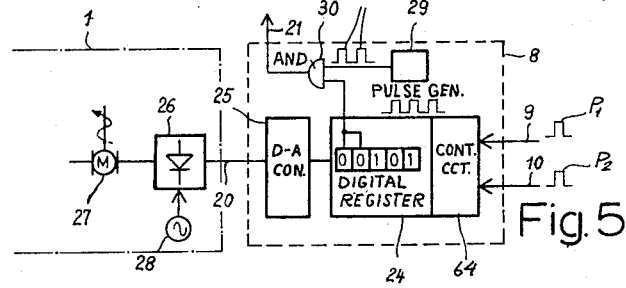
FIG. 5 is a more detailed block-schematic view of the co-ordinating system of FIG. 1.

The overall mode of operation of the co-ordinator 8 shown in FIG. 1 will now be described with reference to FIG. 5. As illustrated in the latter figure, this co-ordinator comprises a control circuit 64 which receives the metering pulses over lines 9 and 10 and which steps a pulse counter 24 comprising a digital register 40 with $n$ (here five) binary stages. The count of register 40 is increased by one in response to any pulse $P_1$ on lead 9 and is decreased by one in response to any pulse $P_2$ on lead 10. The value of that numerical count is a measure of the slack 5 of web 3 in FIG. 1. This value may be transformed into a control variable, such as a voltage, by a digital-analog converter 25 whose output is shown applied, via line 20, to a voltage regulator 26 of the controlled-rectifier type serving to adjust the operating speed of the drive motor 27 of machine 1. At the same time, or alternatively, the register 40 may be used directly to control the operation of machine 2; this end, several (here two) of the highest-order stages of this register are jointly connected to one input of an AND circuit 30 whose other input receives a succession of driving pulses D from a pulse generator 39. If the setting of either or both of these two register stages corresonds to the digit "1," the gate 30 passes the pulses D to line 21 to drive the machine 2 (FIG. 1). Thus, the minimum slack represented by level $h_{min}$ in FIG. 1 corresponds to a count of 01000 whereas the maximum slack $h_{max}$ is reflected in some higher count (e.g. 1000) whose magnitude as evaluated by converter 25 causes a sufficient throttling of motor 27 to prevent any further overfeeding of web 3.

The processing of metering pulses $P_1$ and $P_2$ in circuit 64 and the additive or subtractive stepping of counter 34 by these pulses will now be described in greater detail with reference to FIGS. 6 and 7. FIG. 7 shows the control circuit 64 as comprising a pair of input flip-flops 31, 32 that are normally in a reset condition in which a finite voltage, of either polarity, appears on respective transmission lines 73 and 74. Feed lines 9 and 10 are so connected to inputs of flip-flops 31, 32, respectively, that the appearance of a pulse $P_1$ or $P_2$ sets the associated flip-flop so that the voltage on line 73 or 74 disappears. A bistable output element in the form of a flip-flop 35, having outgoing leads 36 and 37, has its two inputs connected to lines 73 and 74, respectively, by way of respective AND circuits 33, 34 which act as means for temporary blocking, under conditions described hereinafter, the transmission of signals from flip-flops 31 and 32 to flip-flop 35. Each of the gates 33, 34 has three inputs with individual inverters 75, 76, one of these inputs being connected to the corresponding transmission line 73, 74 and including a respective delay network 77, 78. The second and third inputs of AND circuits 33 and 34 are connected in parallel to two blocking lines 79 and 80, respectively. The combinations of elements 33, 75, 77 and 34, 76 and 78 may be regarded as a pair of delayed-action NOR gates.

A pair of similar NOR gates, but with only two inputs each, have been represented by two AND circuits 44, 45 and associated inverters 81, 82. The inputs of AND circuit 44 are respectively connected to lines 73 and 37 whereas the inputs of AND circuit 35 are similarly tied to lines 74 and 36. Thus, gates 44, 45 act as verification circuits determining the proper response of element 35 to the setting of flip-flop 31 or 32, preventing the counting of a pulse until the verification is positive. The outputs of these two NOR gates are connected via an OR circuit 67 to an input of a monostable multivibrator 46 arranged in cascade with a second monostable multivibrator 47, the two multivibrators together defining a timing circuit 48. Multivibrator 46, assumed to have a cycle length of 1 ms. when tripped into its off-normal condition, has an output terminal connected to blocking line 79 as well as to the input of multi vibrator 47 whose cycle length is assumed to be 3 ms.; the latter multivibrator has an output terminal connected to blocking line 80. A second output of multivibrator 46 feeds a lead 43 for the transmission of a stepping pulse S to counter 24. The corresponding second output of multivibrator 47 energizes a line 69 connected in parallel to one set of inputs of two AND circuits 49, 50 feeding the reset leads of flip-flops 31, 32; the other inputs of AND circuits 49 and 50 are repectively connected to lines 37 and 36. Each input of these AND circuits also includes an individual inverter 83 and 84.

The output leads 36, 37 of flip-flop 35 are connected to respective input leads 38, 39 of counting circuit 24. The register of this counter, designated 40 in FIG. 5, is here shown to comprise several flip-flops $40a$, $40b$ ... $40n$ representing the $n$ binary stages thereof. The first flip-flop $40a$ receives, at its single input 42 common to both sections, the stepping pulses S from line 43 of circuit 64. It is assumed that this flip-flop responds to the (positive) trailing edge of pulse S, owing to the presence of suitable reactances symbolized by a condenser 88 in input lead 42. These flip-flops are connected in cascade with interposition of respective triggering circuits $41a$ ... $41(n-1)$ which are bridged in parallel across the lines 38 and 39; voltage on line 38 represents an "add" signal whereas voltage on line 39 constitutes a "substract" signal. As particularly illustrated for circuit $41a$, each of those triggering circuits includes a pair of AND gates 85, 86 with associated inverters 85', 86' and differentiators 85", 86", responding to signals from lines 38, 39 as well as to brief pulses from the immediately preceding flip-flop such as $40a$, and an OR gate 87 which applies the outputs of the two AND gates to the immediately following flip-flop such as $40b$. One of the output terminals of each flip-flop $40a$–$40n$ is connected to the input of converter 25 via a respective conductor $25a$, $25b$ ... $25(n-1)$, $25n$. The two last-mentioned conductors $25(n-1)$ and $25n$, emanating from the two highest-order stages of the counter, are combined in an OR circuit 65 to make the AND circuit 30 conductive for the driving pulse D arriving from pulse generator 29. The outputs of converter 25 and gate 30 appear on lines 20 and 21, respectively, which regulate the operating speeds of machines 1 and 2 as described in connection with FIG. 5.

The operation of the system 8 shown in FIG. 7 will now be described with reference to the several graphs in FIG. 6 which are numbered 9, 10, 36, 37, 43, 69, 73 and 74 to indicate the respective voltages on the leads so designated. Let us first assume that circuit 65 is in its quiescent state, i.e. that no pulses appear on lines 9 and 10, with flip-flops 31 and 32 in their reset condition so that lines 73 and 74 are energized (e.g. at positive potential). Let it be further supposed that flip-flop 35 be in the condition in which line 37 carries voltage whereas line 36 does not, this condition being the one assigned to input flip-flop 32 and being referred to hereinafter as the No. 2 state of bistable element 35. Multivibrators 46 and 47 are in their normal condition so that a voltage (assumed to be positive) is present on lead 43.

Let the first metering pulse to arrive be a pulse $P_{1a}$ on line 9. This pulse, after a brief delay $\delta$ due to circuit 77, sets the flip-flop 31 so that line 73 is de-energized and, with lines 79 and 80 also at zero voltage, opens the NOR gate 33, 75, 77 to feed the upper input of element 35, thereby flipping it into its No. 1 state. This is reflected in a positive voltage on line 36 and a de-energization of line 37. At the same time, the NOR gate 81, 44 is opened by the disappearance of voltage from line 37 so that multivibrator 46 is tripped and a negative stepping pulse $S_a$ appears on line 43. When, after a period of 1 ms., multivibrator 46 reverts to its normal condition, it trips the associated multivibrator 47 which remains off-normal for a somewhat longer period, here 3 ms., sufficient to allow for the registration of pulse $P_{1a}$ in counter 24. At the same time, owing to the de-energization of line 37, the actuated flip-flop 31 is reset as the AND gate 49 is opened by inversion of the pulse appearing on line 69. In the off-normal state of either multivibrator 46, 47 the AND circuits 33 remain blocked so that the condition of element 35 cannot be changed.

When the trailing edge of pulse $S_a$ becomes effective to switch the flip-flop $40a$ of counter 24, and "add" signal already is present on line 38 to identify the metering pulse as one coming from the lead unit 1 (FIGS. 1 and 5), as distinct from the follower unit 2, so that the count of register 40 must be increased rather than decreased.

This increase in the count occurs by a simple reversal of flip-flop 40a if the latter had been in its "0" condition, i.e. if there had been no voltage on lead 25a extending to converter 25; upon such reversal, lead 25 is energized but none of the other flip-flops is stepped because none of the AND gates of the following triggering circuit 41a is conductive as the positive switching pulse from condenser 85" coincides with a "0" signal from inverter 85' in the input of AND gate 85. If flip-flop 40a had been in its alternate condition, representing the digit "1," its resetting to "0" would have created a stepping pulse in AND gate 86 to reverse the next flip-flop 40b and so on until the transmission of a carry is terminated at a stage found to be in the "0" condition. When, on the other hand, line 39 is energized instead of line 38 to dictate the subtractive registration of a pulse, a carry is transmitted from the first stage or stages which happen to be initially in the "0" condition until a stage is reached which before reversal indicates the digit "1."

After a delay of 4 ms., multivibrator 47 is restored to normal and voltage is removed from line 79, thus unblocking the transmission channels from flip-flops 31, 32 to flip-flop 35. The period of 4 milliseconds is less than the minimum spacing of any two metering pulses $P_1$ or $P_2$.

Figure 6:
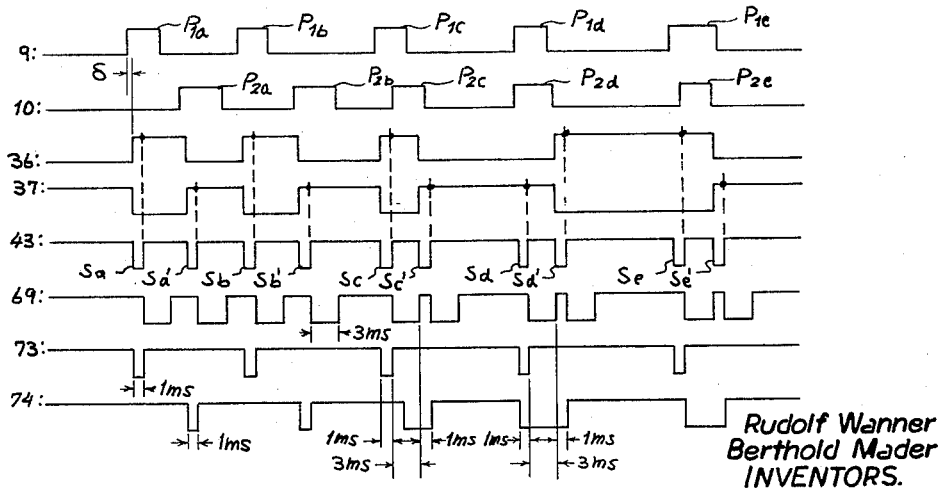
FIG. 6 is a set of graphs showing various pulse trains and switching voltages occurring in the system of FIG. 5.

As indicated in graph 10 of FIG. 6, there next occurs a pulse $P_{2a}$ in the input of flip-flop 32 which is thus set and, again after a slight delay due to circuit 78, reverses the bistable element 35 and concurrently restarts the timer 48 to generate another stepping pulse $S_a'$. Counter 24 responds in the aforedescribed manner but with subtractive registration, as already explained, owing to the energization of lines 37 and 39 in lieu of lines 36 and 38.

In the example illustrated in FIG. 6, two further metering pulses $P_{1b}$, $P_{2b}$ occurs nonoverlappingly on leads 9 and 10, giving rise to stepping pulses $S_b$ and $S_b'$, whereupon still another pulse $P_{1c}$ on lead 9 additively steps the counter 24 by means of a pulse $S_c$. Before the pulse $P_{1c}$ has subsided, yet while timer 48 still maintains the gates 33 and 34 cut off, another subtractive pulse $P_{2c}$ arrives on lead 10, setting flip-flop 32. After gate 34 reopens, and for another 4 ms. thereafter, flip-flop 32 remains in its set state as represented by zero potential on line 74: the corresponding stepping pulse has been designated $S_c'$. Next, two pulses $P_{1d}$, $P_{2d}$ appear simultaneously in the inputs of flip-flops 31 and 32, thus setting these flip-flops; since, however, flip-flop 35 had been left in its No. 2 state by the immediately preceding pulse $P_{2c}$, line 36 carries no voltage and NOR gate 82, 45 responds immediately to start the timer 48, blocking the transmission of the pulse $P_{1d}$ from flip-flop 31 to flip-flop 35. Thus, there is first generated a stepping pulse $S_d'$ for subtractively actuating the counter 24 in response to pulse $P_{2d}$; after a timing interval of 4 ms., flip-flop 32 is cleared by the coincidence of a terminal signal from condenser 89 with zero voltage on line 36. Flip-flop 31, which has remained set during this period, is free to reverse the flip-flop 35 as soon as the blocking of its transmission channel has been lifted by timer 48. Immediately thereafter, the timer goes into another operating cycle while a stepping pulse $S_d$ is generated to nullify the effect of pulse $S_d'$ previously registered. The net result would, of course, have been the same if, contrary to the example just given, flip-flop 35 had been in its No. 1 state at the time of arrival of pulses $P_{1d}$ and $P_{2d}$, i.e. the condition shown to exist during the nearly simultaneous arrival of two pulses $P_{1e}$ and $P_{2e}$ which leads first to the generation of an additive stepping pulse $S_e$, without reversal of element 35, followed by the generation of a subtractive stepping pulse $S_e'$ canceling the effect of the former, flip-flop 32 remaining set in this case for longer than a complete operating period (4 ms.) of timer 48.

Figure 8:
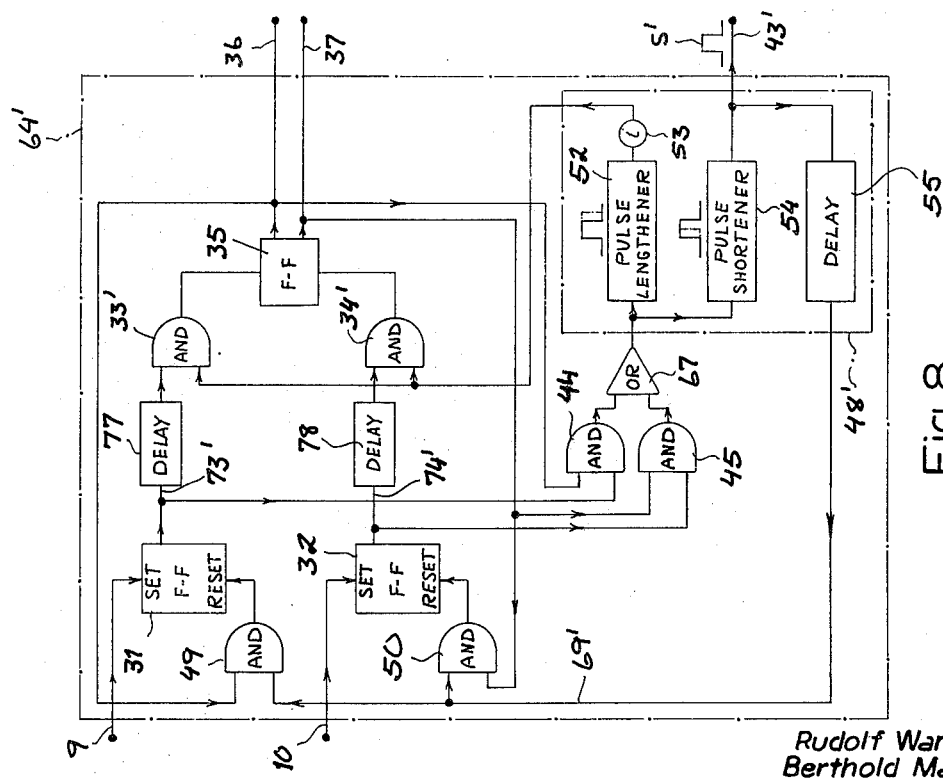

In FIG. 8 we have illustrated an alternative control circuit 64' wherein elements corresponding to those of circuit 64 (FIG. 7) have been designated by the same reference numerals. Circuit 64' differs from circuit 64 mainly by the provision of a modified timer 48 which comprises a pulse-lengthening network 52 and a pulse-shortening network 54 connected in parallel to the output of OR gate 46. AND gate 44 is here connected, without the use of inverters, to line 36 and a line 73' which extends from the "set" output of flip-flop 31, in contradistinction to line 73 of FIG. 7, to AND gate 33'; AND gate 45 is analogously connected to line 37 and to a line 74' leading from the "set" output of flip-flop 32 to AND gate 34'. Gates 33' and 34' have only two inputs each and lack the inverters 75, 76 of FIG. 7. Network 52 delays the trailing edge of a timing pulse produced by flip-flop 31 or 32 whenever either of these flip-flops is set by a metering pulse as previously described; network 54 delays the leading edge of the same timing pulse. Through an inverter 53 the pulse from network 52 is applied to AND gates 33' and 34' so as to block these gates for a period which, as in the preceding embodiment, should be sufficient to allow a stepping of the associated counter in response to a metering pulst but should be less than the minimum spacing of the pulses of either train $P_1$ or $P_2$; this blocking interval may again be 4 ms. Network 54, on the other hand, delays the leading edge of the timing pulse so as to foreshorten the latter and to convert it into a stepping pulse S', here of positive polarity, whose leading edge may be used in this case to actuate the counter, in contradistinction to the aforedescribed arrangement in which the trailing edge of stepping pulse S was so utilized. The output line 43' of network 54 is also connected to the common input line of AND gates 49 and 50, advantageously through the intermediary of a delay network 55, so that pulse S' also serves—preferably with some delay—as the terminal signal which resets the flip-flops 31 and 32 substantially at the end of the operating cycle of the timer. It will be noted that the other inputs of AND circuits 49 and 50 have been directly connected, without an inverter, to output lines 36 and 37, respectively, which carry positive voltage whenever the corresponding flip-flop 31 or 32 has been set.

Figure 9:
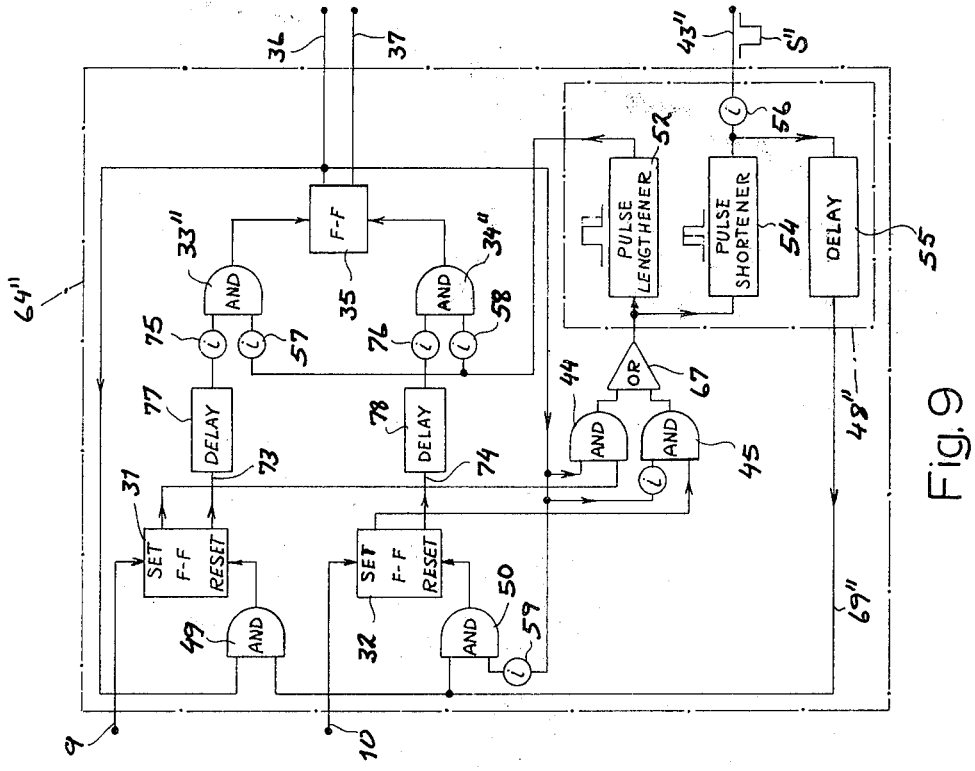
FIGS. 8 and 9 show two modifications of a control circuit forming part of the circuit arrangement of FIG. 7.

In FIG. 9, finally, we have shown another modified control circuit 64" which has a timer 48" generally similar to that of FIG. 8, except for the presence of an inverter 56 in its outgoing line 43" which again results in the generation of a negative stepping pulse S" similar to pulse S of FIG. 7. Inverter 53 in the output of network 52 (FIG. 8) has been replaced by a pair of inverters 57, 58 in the inputs of AND gates 33", 34" which also have other inverters 75, 76, as in FIG. 7, connected in their input leads 73 and 74. Thus, elements 33", 57, 75 and 34", 85, 76 again constitute a pair of NOR gates as in the first embodiment. Furthermore, the feedback connections to AND gates 49 and 50, which serve to reset the flip-flops 31 and 32, are here shown connected to a common output line of flip-flop 35, here the line 36, with interposition of an inverter 59 between line 36 and AND circuit 50 only. The operation of AND gates 49 and 50 is here substantially the same as in the system of FIG. 8, it being noted that input line 69" of these AND gates has been connected to the output of network 54, via delay circuit 55, at a point ahead of inverter 56.

From the foregoing description it will be apparent that a variety of circuit arrangements may be devised for temporarily storing the incoming metering pulses during generation of stepping pulses and for isolating the pulse storers 31, 32 from the input of the counter during registration of a preceding metering pulse. Naturally, features described in connection with FIGS. 7, 8 and 9 may be interchanged or combined, within the limits of compatibility, and many other modifications readily apparent to persons skilled in the art may also be made in the herein disclosed system without departing from the spirit and scope of our invention.

We claim:
1. A system for co-ordinating the operations of two coacting units cooperating with a web having a predetermined slack, comprising:
first pulse-generating means coupled with one of said units for delivering a train of first metering pulses having a cadence proportional to the operating speed of said one of said units;
second pulse-generating means coupled with the other of said units for delivering a train of second metering pulses having a cadence proportional to the operating speed of said other of said units;
pulse-counting means including a digital register;
a control circuit including first transmission means connecting said first pulse-generating means to said pulse-counting means for additively stepping said register in response to said first metering pulses, said control circuit further including;
second transmission means connecting said second pulse-generating means to said pulse-counting means for subtractively stepping said register in response to said second metering pulses;
and regulating means responsive to a predetermined minimum count of said register for relatively readjusting the operating speeds for maintaining said slack of said units to keep them in step.

2. In combination, a web-feeding machine, a web-cutting machine and a system as defined in claim 1 for co-ordinating the operations of said machines, said first and second pulse-generating means being respectively coupled with said web-feeding machine and said web-cutting machine for limiting the slack of a web passing from the former to the latter.

3. The combination defined in claim 2 wherein each of said pulse-generating means comprises a shaft operatively coupled with the respective machine, a pair of relays controlled by said shaft for alternate operation in the course of a shaft revolution, and a flip-flop with two inputs respectively connected to said relays for alternate switchover into either of two stable conditions.

4. A system for co-ordinating the operations of two coacting units, comprising:
first pulse-generating means coupled with one of said units for delivering a train of first metering pulses having a cadence proportional to the operating speed of said one of said units;
second pulse-generating means coupled with the other of said units for delivering a train of second metering pulses having a cadence proportional to the the operating speed of said other of said units;
pulse-counting means including a digital register;
a control circuit including first transmission means connecting said first pulse-generating means to said pulse-counting means for additively stepping said register in response to said first metering pulses, said control circuit further including second transmission means connecting said second pulse-generating means to said pulse-counting means for subtractively stepping said register in response to said second metering pulses;
and regulating means responsive to a perdetermined minimum count of said register for relatively readjusting the operating speeds of said units to keep them in step, said control circuit comprising a bistable element with two inputs and two outputs, said pulse-counting means having additive and subtractive control leads respectively connected to said outputs, said first transmission means including a first flip-flop settable by said first metering pulses and a first channel linking said first flip-flop to one of said inputs, said second transmission means including a second flip-flop settable by said second metering pulses and a second channel linking said second flip-flop to the other of said inputs, said control circuit further comprising timer means responsive to a setting of either of said flip-flops for resetting same after an interval sufficient to enable a stepping of said register, said bistable element having two operating conditions respectively assigned to said flip-flops for alternately energizing its two outputs.

5. A system as defined in claim 4 wherein said control circuit includes a source of delayed stepping pulses for said register, said source being connected to at least one of said outputs and to said flip-flops for operating within said interval in response to a setting of either of said flip-flops by a respective metering pulse and upon said bistable element assuming a condition assigned to the set flip-flop.

6. A system as defined in claim 5 said first and second channels include blocking means controlled by said source for disconnecting said bistable element from said flip-flops during generation of said stepping pulses.

7. A system as defined in claim 6 wherein said source forms part of said timer means, the latter being connected to maintain said blocking means effective beyond the end of said interval.

8. A system for co-ordinating the operations of two co-acting units, comprising:
first pulse-generating means coupled with one of said units for delivering a train of first metering pulses having a cadence proportional to the operating speed of said one of said units;
second pulse-generating means coupled with the other of said units for delivering a train of second metering pulses having a cadence proportional to the operating speed of said other of said units;
pulse-counting means including a digital register;
a control circuit including first transmission means connecting said first pulse-generating means to said pulse-counting means for additively stepping said register in response to said first metering pulses, said control circuit further including second transmission means connecting said second pulse-generating means to said pulse-counting means for subtractively stepping said register in response to said second metering pulses;
and regulating means responsive to a predetermined minimum count of said register for relatively readjusting the operating speeds of said units to keep them in step, said control circuit comprising a bistable element with two inputs and two outputs, said pulse-counting means having additive and subtractive control leads respectively connected to said outputs, said first transmission means including a first flip-flop settable by said first metering pulses and a first channel linking said first flip-flop to one of said inputs, said second transmission means including a second flip-flop settable by said second metering pulses and a second channel linking said second flip-flop to the other of said inputs, said control circuit further comprising timer means responsive to a setting of either of said flip-flops for resetting same after an interval sufficient to enable a stepping of said register, said bistable element having two operating conditions respectively assigned to said flip-flops for alternately energizing its two outputs, said control circuit including a source of delayed stepping pulses for said register, said source being connected to at least one of said outputs and to said flip-flops for operating within said interval in response to a setting of either of said flip-flops by a respective metering pulse and upon said bistable element assuming a condition assigned to the set flip-flop, said first and second channels include blocking means controlled by said source for disconnecting said bistable element from said flip-flops during generation of said stepping pulses, said source forming part of said timer means, the latter being connected to maintain said blocking means effective beyond the end of said interval, said timer means including a pair of monostable elements connected in cascade, each of said monostable elements having an output lead connected to said blocking means, said source being an output lead of the first of said monostable elements.

9. A system as defined in claim 8 wherein each of said flip-flops has a setting lead connected to the respective pulse-generating means and further has a resetting lead with a conjunctive gate disposed therein, said gate having a first input lead connected to a control terminal of said timer means and a second input lead connected to one of the outputs of said bistable element whereby, upon substantially simultaneous setting of both flip-flops by respective metering pulses, the flip-flop corresponding to the instantaneous condition of said bistable element is first effective to step said register whereupon, following resetting of the last-mentioned flip-flop, said bistable element is reversed by the other flip-flop and renders the latter effective to step said register.

10. A system as defined in claim 8 wherein said pulse-counting means includes an actuating circuit for said register responsive to the trailing edges of said stepping pulses.

11. A system as defined in claim 8 wherein said register comprises a plurality of binary stages, said regulating means including a driving circuit for said other of said units connected to at least one of the highest-order stages of said register and responsive to the appearance of a "1" in any stage so connected whereby said other of said units is driven only upon the count of said register reaching said predetermined minimum.

12. A system as defined in claim 8 wherein said regulating means includes a digital-analog converter connected to said register.

13. A system for co-ordinating the operations of two coacting units, comprising:
   first pulse-generating means coupled with one of said units for delivering a train of first metering pulses having a cadence proportional to the operating speed of said one of said units;
   second pulse-generating means coupled with the other of said units for delivering a train of second metering pulses having a cadence proportional to the operating speed of said other of said units;
   pulse-counting means including a digital register;
   a control circuit including first transmission means connecting said first pulse-generating means to said pulse-counting means for additively stepping said register in response to said first metering pulses, said control circuit further including second transmission means connecting said second pulse-generating means to said pulse-counting means for subtractively stepping said register in response to said second metering pulses;
   and regulating means responsive to a predetermined minimum count of said register for relatively readjusting the operating speeds of said units to keep them in step, said control circuit comprising a bistable element with two inputs and two outputs, said pulse-counting means having additive and subtractive control leads respectively connected to said outputs, said first transmission means including a first flip-flop settable by said first metering pulses and a first channel linking said first flip-flop to one of said inputs, said second transmission means including a second flip-flop settable by said second metering pulses and a second channel linking said second flip-flop to the other of said inputs, said control circuit further comprising timer means responsive to a setting of either of said flip-flops for resetting same after an interval sufficient to enable a stepping of said register, said bistable element having two operating conditions respectively assigned to said flip-flops for alternately energizing its two outputs, said control circuit including a source of delayed stepping pulses for said register, said source being connected to at least one of said outputs and to said flip-flops for operating within said interval in response to a setting of either of said flip-flops by a respective metering pulse and upon said bistable element assuming a condition assigned to the set flip-flop, said first and second channels include blocking means controlled by said source for disconnecting said bistable element from said flip-flops during generation of said stepping pulses, said source forming part of said timer means, the latter being connected to maintain said blocking means effective beyond the end of said interval, said timer means including a pair of pulse-shaping networks for respectively lengthening and shortening a timing pulse from either of said flip-flops.

14. A system for co-ordinating the operations of two coacting units, comprising:
   first pulse-generating means coupled with one of said units for delivering a train of first metering pulses having a cadence proportional to the operating speed of said one of said units;
   second pulse-generating means coupled with the other of said units for delivering a train of second metering pulses having a cadence proportional to the operating speed of said other of said units;
   pulse-counting means including a digital register;
   a control circuit including first transmission means connecting said first pulse-generating means to said pulse-counting means for additively stepping said register in response to said first metering pulses, said control circuit further including second transmission means connecting said second pulse-generating means to said pulse-counting means for subtractively stepping said register in response to said second metering pulses;
   and regulating means responsive to a predetermined minimum count of said register for relatively readjusting the operating speeds of said units to keep them in step, said control circuit comprising a bistable element with two inputs and two outputs, said pulse-counting means having additive and subtractive control leads respectively connected to said outputs, said first transmission means including a first flip-flop settable by said first metering pulses and a first channel linking said first flip-flop to one of said inputs, said second transmission means including a second flip-flop settable by said second metering pulses and a second channel linking said second flip-flop to the other of said inputs, said control circuit further comprising timer means responsive to a setting of either of said flip-flops for resetting same after an interval sufficient to enable a stepping of said register, said bistable element having two operating conditions respectively assigned to said flip-flops for alternately energizing its two outputs, said control circuit including a source of delayed stepping pulses for said register, said source being connected to at least one of said outputs and to said flip-flops for operating within said interval in response to a setting of either of said flip-flops by a respective metering pulse and upon said bistable element assuming a condition assigned to the set flip-flop, said first and second channels include blocking means controlled by said source for disconnecting said bistable element from said flip-flops during generation of said stepping pulses, said source forming part of said timer means, the latter being connected to maintain said blocking means effective beyond the end of said interval, said system further comprising circuit means for verifying the correlation of the condition of said bistable element with the setting of either of said flip-flops and for inhibiting the operation of said timer means in the absence of such correlation.

15. A system as defined in claim 14 wherein each of said channels includes delay means for preserving the condition of said bistable element during a period sufficient to enable operation of said circuit means.

References Cited

UNITED STATES PATENTS

| | | | |
|---|---|---|---|
| 2,656,106 | 10/1953 | Stabler | 328—44 |
| 2,817,775 | 12/1957 | Rosenberg et al. | 235—151.11 |
| 3,200,340 | 8/1965 | Dunne | 328—155 |
| 3,206,665 | 9/1965 | Burlingham | 328—44 |
| 3,312,903 | 4/1967 | Webb | 328—155 |
| 3,323,067 | 5/1967 | Eckl | 307—215 |
| 3,367,110 | 2/1968 | Leeson | 328—74 |
| 3,391,343 | 7/1968 | McCurdy | 328—44 |

JOHN S. HEYMAN, Primary Examiner

H. A. DIXON, Assistant Examiner

U.S. Cl. X.R.

83—78; 235—151.11; 328—44